Dec. 24, 1968  R. G. McMILLEN  3,418,006
STEERING MECHANISM
Filed Oct. 31, 1966  2 Sheets-Sheet 1
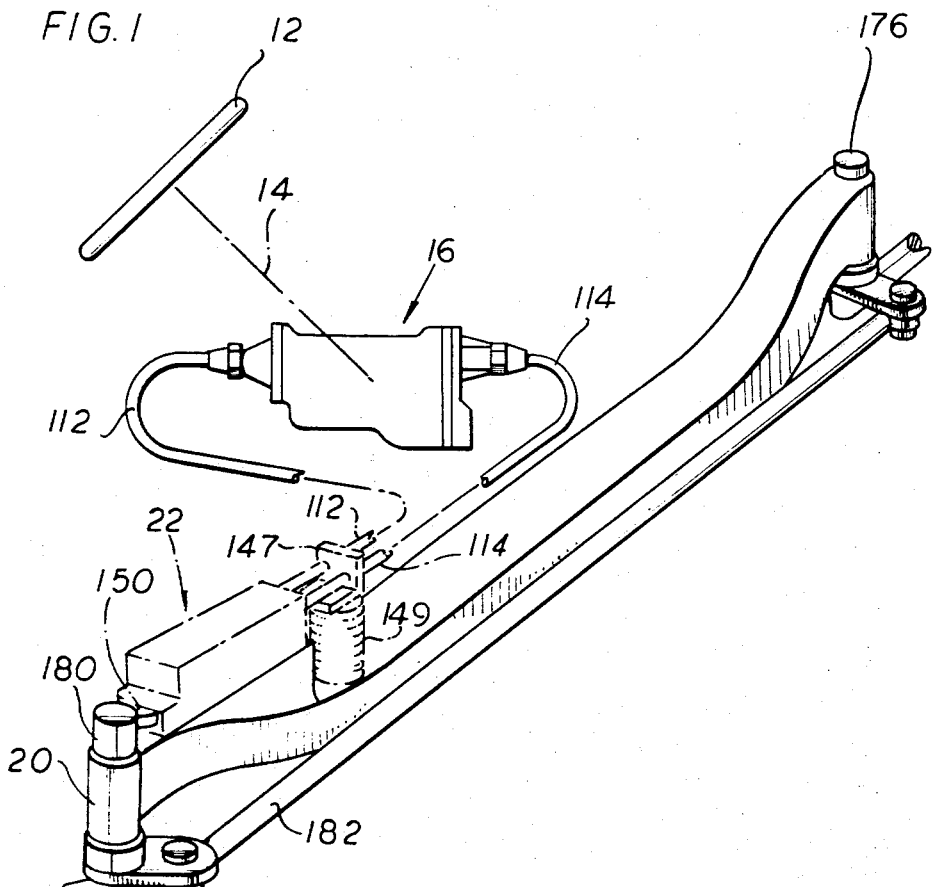
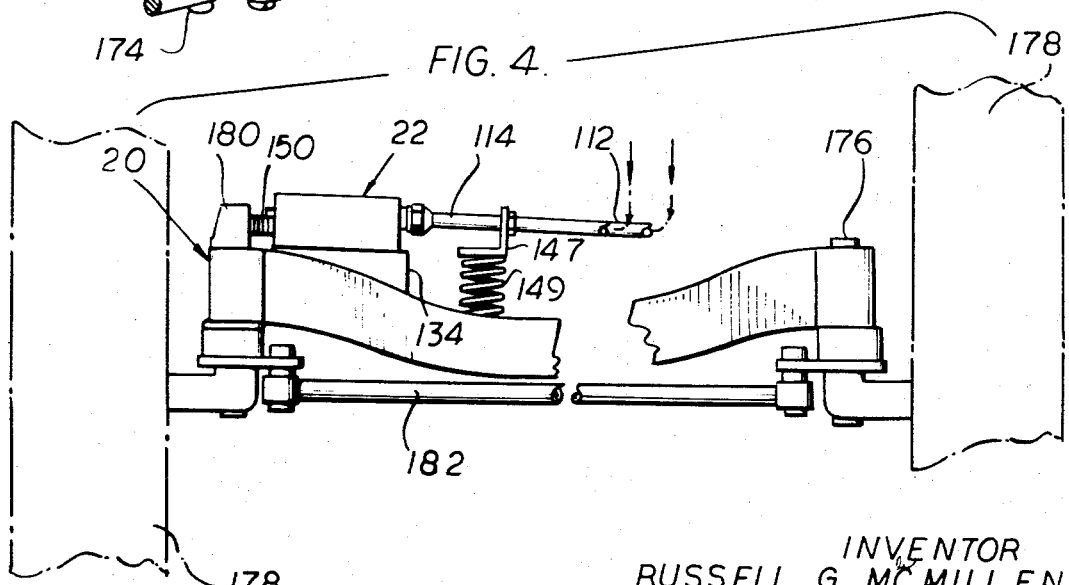
INVENTOR
RUSSELL G. McMILLEN
Frederick H. Henke
ATTY

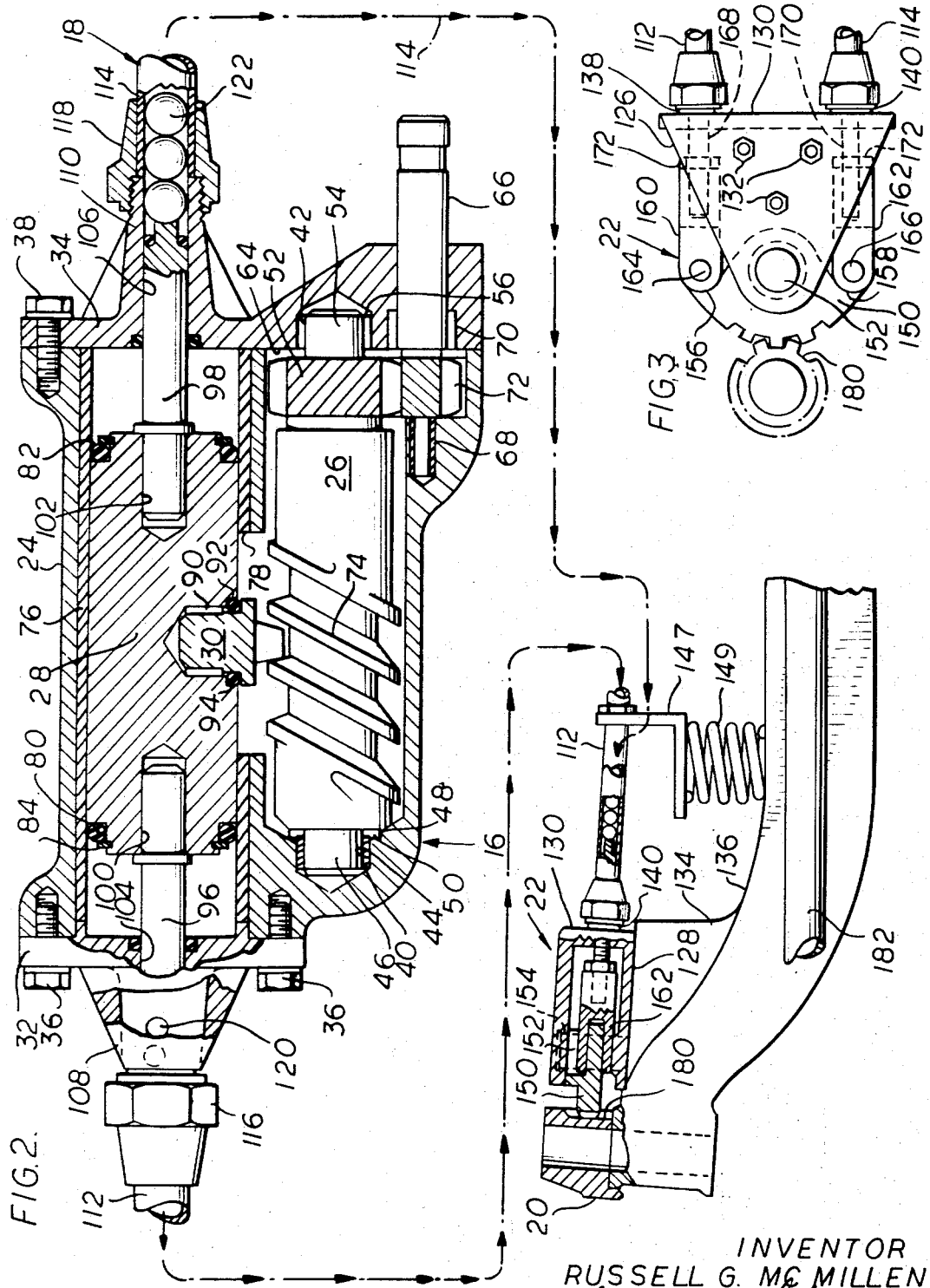

United States Patent Office 3,418,006
Patented Dec. 24, 1968

3,418,006
STEERING MECHANISM
Russell G. McMillen, Fort Wayne, Ind., assignor to International Harvester Company, Chicago, Ill., a corporation of Delaware
Filed Oct. 31, 1966, Ser. No. 590,776
11 Claims. (Cl. 280—96)

ABSTRACT OF THE DISCLOSURE

A vehicle steering mechanism wherein a gearing arrangement is utilized for operatively connecting a steering knuckle actuating means to a steering knuckle and flexible motion transmitting means are employed for operatively connecting the vehicle steering wheel and the steering knuckle actuating means.

---

This invention relates to a vehicle steering mechanism and more particularly to a mechanism which may be located remotely from and operated independently of the vehicle axle to which the vehicle wheels are operatively connected.

A principal object of this invention is to provide a vehicle steering mechanism utilizing a flexible motion transmitting means and including a steering control unit which can be located remotely to and independent of the geometry and articulation of the axle.

Another object is to provide a steering control unit wherein substantially no moving parts are exposed thereby increasing the service and wear life of the unit.

Another object of the invention is to provide a steering control unit wherein the rotational motion of a worm shaft is translated into a linear motion to actuate a flexible motion transmitting means and thereby position the steerable wheels of a vehicle.

The above and other objects and advantages will be more readily apparent when read in conjunction with the accompanying drawings in which:

FIGURE 1 is a diagrammatic view of the steering mechanism of a motor vehicle;

FIGURE 2 is a sectional view of a steering control unit and a steering knuckle actuating means incorporated in the steering mechanism of FIGURE 1;

FIGURE 3 is a plan view of the steering knuckle actuating means; and

FIGURE 4 is a front elevational view of the motor vehicle.

Referring now to the drawings, wherein like reference characters in the several views refer to the same parts, 10 designates generally the complete steering mechanism of a vehicle. It includes a steering wheel 12 mounted on a steering column 14. Steering mechanism 10 also includes a steering control unit 16, flexible motion transmitting means 18, steering knuckle means 20 mounted on the chassis frame and steering knuckle actuating means 22.

Briefly described, the turning of the steering wheel 12 actuates the control unit 16 which in turn transmits rotating motion to the steering knuckle means 20 and vehicle wheels attached thereto through the flexible motion means 18 and the actuating means 22.

The steering control unit 16 comprises a housing 24, an elongated worm shaft 26 rotatably mounted in the housing 24, a linearly movable member 28 slidably mounted in the housing 24 and operatively connected to the worm shaft 26 by a follower 30.

The housing 24 may be in the form of an elongated hollow casting, closed at opposite ends by end cap members 32 and 34, which may be secured in place on the casting by suitable means such as bolts 36 and 38. The worm shaft 36 may be rotatably mounted in the housing by means of needle bearings 40 and 42 disposed at opposite ends of the worm shaft 26. The housing 24 has a bore 44 formed therein to receive the needle bearings 40 and the reduced end portion 46 of the shaft 26. The reduced end portion 46 together with the larger diameter portion of the shaft 26 form a shoulder 48. A thrust bearing 50 encircles shaft 26 and is disposed between the shoulder 48 and a face portion of the housing 24 to take thrust of the shaft 26 to the left. A spur gear 52 is attached to or formed on the right end of shaft 26 as viewed in FIGURE 2 thereby to take the drive from the steering column. The right end of shaft 26 also has a reduced end portion 54 formed thereon, which is rotatably journalled in a bore 56 in end cap member 34. Needle bearings 42 support the end portion 54 in the bore 56. The end portion 56 is the same size as end portion 46 and with the side of the gear 52 forms a shoulder 60. A thrust bearing 62 is disposed between the shoulder 60 and the face portion 64 of the end cap 34 to take thrust of the shaft 26 to the right. A lower end portion 66 of the steering column 14 is rotatably journalled in the housing 24 by suitable means such as needle bearings 68 and 70, disposed on opposite sides of pinion gear 72 attached to or formed on the lower end portion 66. The pinion gear 72 meshes with gear 52. The pinion gear 72 preferably is of a size to establish a 2:1 ratio with gear 52, so that one revolution of the steering column 14 and gear 72 will cause a half revolution of gear 52 and shaft 26 to which it is attached.

A helical worm thread 74 is formed on the shaft 26 and is adapted to receive follower 30 which rides in the thread 74. It will be apparent from FIGURE 2 that the shaft 26 is confined against axial movement.

The linearly movable member 28 is disposed in the housing 24 in such a manner that it may move linearly to the right or left as viewed in FIGURE 2 as the rotational motion of the worm shaft 26 is transmitted to it through the follower 30. The member 28 may comprise a cylindrical pistol-like member. A cylindrical liner may be provided in the housing 24 to slidably accommodate the piston member 28. An opening 78 is provided in the liner through which the follower 30 extends. Sealing means here shown as O-ring seals 80 and 82 may be positioned at each end of the member 28 and retained in place by retaining ring members 84 and 86 respectively. A radially extending closed end bore 88 is formed substantially midway the length of the member 28 intersecting the outer periphery thereof. The follower 30 is rotatably journalled in the bore 88 and this may be done by means of needle roller bearings 90. A counterbore 92 is formed coaxially with bore 88. Bearing means 94 here shown in the form of ball bearings may be positioned in the counterbore 92. The bearings 90 and 94 provide for a flexibility of movement between the worm shaft 26 and the piston member 28 which makes for a smoother operation and reduces the likelihood of jamming between those two members.

Plunger rods 96 and 98 are attached to the respective ends of the member 28. They may be secured in bores 100 and 102 respectively by press fits or threaded into the bores. A bore 104 is formed in end cap member 32 coaxially with the bore 100 in member 28 to slidably receive the other end of plunger 96. A bore 106 is formed in end cap member 34 coaxially with the bore 102 in member 28 to slidably receive the other end of plunger 98. Sealing members 108 and 110 surround plunger rods 96 and 98 being secured in place by suitable means in the inner faces of end cap members 32 and 34 respectively.

Means may be provided on plunger rods 96 and 98 to keep member 28 from turning. Such means may include any non-round shape formed on the periphery of the rods. The end caps 32 and 34 have bosses 108 and 110 formed thereon respectively, the bore 104 extending through the boss 108 and bore 106 extending through boss 110.

The flexible motion transmitting means 18 includes a pair of flexible tubular members 112 and 114 attached respectively to the bosses 108 and 110. They are secured thereto by retaining nut members 116 and 118 which surround the ends of the tubular members and are threaded onto the bosses 108 and 110. Flexible hose sections or formed steel tubular members may be substituted for the members 112 and 114. A plurality of balls 120 fill the tubular member 112 and a plurality of similar balls 122 fill tubular member 114. The other end of tubular members 112 and 114 are connected to the steering knuckle actuating means 22 as seen in FIGURE 3.

The flexible motion transmitting means is an important feature of this steering mechanism because it permits the steering control unit 16 to be mounted remotely from the vehicle axle thus relieving that unit and the steering column from some of the shocks that would otherwise normally be transmitted through the complete steering gear. In other words, the flexible motion transmitting means is effective to absorb shocks encountered as the vehicle wheels travel over a variety of terrain. In addition, of course, the flexible motion transmitting means is particularly useful in this steering mechanism arrangement because the design of the complete mechanism is less critical from the standpoint of arranging otherwise complicated linkage mechanism to transmit motion from the steering column to the vehicle wheels. In place of the ball and tube assemblies, a pull type cable could also be used.

The steering knuckle actuating means 22 comprises a substantially U-shaped triangular bracket 124 having upper and lower triangular flange portions 126 and 128 and connecting flange portion 130. The bracket 124 is secured by suitable means such as bolts 132 to a support bracket connected to the front axle 136 of the vehicle. A pair of threaded bosses 138 and 140 are formed on the flange 130, and the tubular members 112 and 114 are respectively secured thereto by retaining nut members 142 and 144. Bores 146 and 148 are formed in the bosses 138 and 140 respectively and extend through the bracket 130 for a purpose to be later described. Additional support means is provided for the ends of tubular members 112 and 114 in proximity to the steering knuckle actuating means by a mounting bracket 147 supported on a spring means 149 connected to cross member 136.

The steering knuckle actuating means also comprises a gear segment 150 pivotally mounted in the bracket 124 between the upper and lower flange portions 126 and 128 on a pivot pin 152 which extends through upper flange portion 126, the gear segment 150 and into lower flange portion 128. The pin 152 may be held in place by a snap retainer 154 secured in upper flange portion 126. The gear segment is formed with laterally extending arms 156 and 158 at the outer ends of which are pivotally connected a pair of bifurcated plunger support arms 160 and 162 by means of pivot pins 164 and 166. A plunger rod 168 is screwed into the support arm 160 and a plunger rod 170 is screwed into support arm 162. Lock nuts 172 secure the plunger rods 168 and 170 in place. Plunger rods 168 and 170 extend through bores 146 and 148 respectively into the tubular members 112 and 114 to contact the closest ball in the respective tubular members. Since the balls 120 completely fill the space in the tubular member 112 between the ends of plunger rod 96 attached to member 28 and plunger rod 168, it will be apparent that movement of plunger 96 in a direction to move the balls will move the other plunger 168 to rotate gear segment 150. By the same token, movement of member 28 to the right as viewed in FIGURE 2 will move the plunger rod 98 against the balls 122 thus moving plunger rod 170 (see FIGURE 3) to the left to rotate the gear segment 150 in the opposite direction.

The steering knuckle means 20 includes conventional steering knuckles 174 and 176 pivotally mounted in opposite ends of cross member axle 136. Each of the steering knuckles is adapted to carry a vehicle wheel 178 in a conventional manner. The steering knuckle 174 has gear means 180 formed thereon which meshes with gear segment 150. Thus the steering knuckle is rotated by action of the gear segment 150 of the steering knuckle actuating means. The steering knuckles 174 and 176 are rotated in unison through the tie rod 182 connecting them in a conventional manner.

While operation of the steering mechanism undoubtedly is understood from the foregoing details of construction, a short summary of the operation will now be given. As the steering wheel 12 is turned, the worm shaft 26 is rotated through the gears 72 and 52. This rotating movement is converted to linear movement of the member 28 through the follower 30. This moves either the plunger 96 or 98 in the desired direction to thereby transmit motion through the motion transmitting means 18 to actuate the steering knuckle actuating means 22 and rotate the steering knuckle 174 through the gear means 180 attached thereto. The other steering knuckle, of course, follows through the tie rod 182.

It will be apparent that I have advantageously provided an improved steering mechanism wherein the steering control unit is completely independent of the axle by virtue of a ball carrying flexible tubular member which connects the steering control unit to the steering knuckle actuating means. Thus the steering control unit may be mounted at a place away from the axle and therefore, is not directly subject to road shocks. In addition, the steering control unit itself being a completely closed unit is substantially free from outside dirt thus increasing the service life of the unit.

I claim:

1. In an automotive vehicle having a chassis frame, an axle having wheels pivotally mounted thereon and a steering wheel for positioning the wheels, a steering arrangement comprising:
   a steering control unit including,
   rotatable means rotatable by movement of the steering wheel, and linearly movable means operatively associated with said rotatable means, said movable means being linearly movable upon rotation of said rotatable means;
   steering knuckle means mounted for pivotal movement on the axle;
   steering knuckle actuating means mounted on the axle, said steering knuckle means and said steering knuckle actuating means including a gearing arrangement for establishing operative association between said steering knuckle means and said steering knuckle actuating means; and
   flexible motion transmitting means operatively connected at opposite ends of said linearly movable means and operatively associated with said steering knuckle actuating means to actuate the latter.

2. The steering arrangement of claim 1 wherein:
   said steering knuckle actuating means includes a gear segment adapted to be pivotally mounted on the axle; said gear segments being a part of said gear arrangement, and
   said flexible motion transmitting means is connected to the gear segment on each side of its pivotal mounting.

3. The steering arrangement of claim 1 wherein:
   said steering knuckle actuating means includes a gear segment, said gear segment being a part of said gear arrangement, and a pivotal support for pivotally mounting said gear segment, and
   said motion transmitting means includes first and second tube and ball arrangements connected to said gear segment on opposite sides of said pivotal support whereby movement of said linearly movable means in one direction will cause movement of the balls in one tube to transmit rotational movement to said gear segment in one direction and movement of said linearly movable member in the opposite direction will cause movement of the balls in the other tube to transmit rotational movement to said gear segment in the opposite direction.

4. The steering arrangement of claim 1 wherein said flexible motion transmitting means is a flexible cable arrangement.

5. In an automotive vehicle having a chassis frame, an axle having wheels pivotally mounted thereon, and a steering column having a steering wheel attached thereto, a steering arrangement comprising in combination:

a housing;

a worm shaft rotatably disposed in said housing;

means for operatively connecting the worm shaft to the vehicle steering wheel to be rotated thereby including gear means;

linearly movable means disposed in said housing and adapted to be moved back and forth in response to rotation of said worm shaft;

means operatively connecting said worm shaft and said linearly movable means;

a steering knuckle pivotally mounted on each end of the axle;

a single steering knuckle actuating means mounted on the axle adjacent one of said steering knuckles and operatively associated with said one of said steering knuckles to actuate the same;

a tie rod extending between and having its respective opposite ends pivotally connected to said steering knuckles whereby said steering knuckles are pivotal in unison;

flexible motion transmitting means connected at opposite ends of said linearly movable means and operatively associated with said steering knuckle actuating means to actuate the latter.

6. The combination of claim 5 wherein said means for operatively connecting said worm shaft to said vehicle steering wheel comprises gear means carried by said worm shaft, said gear means being meshable with gear means on the vehicle steering column.

7. The combination of claim 5 wherein said steering knuckle actuating means and said one of said steering knuckles include meshing first and second gear means, said first gear means being fixed to said one of said steering knuckles, a support for said axle for pivotally mounting said second gear means on the axle, and said motion transmitting means includes first and second tube and ball arrangements connected to said second gear means on opposite sides of said support whereby movement of said linearly movable member in one direction will cause movement of the balls in one tube to transmit rotational movement to said second gear means in one direction and movement of said linearly movable member in opposite direction will cause movement of the balls in the other tube to transmit rotational movement to said second gear means in the opposite direction.

8. In a vehicle steering arrangement having wheels pivotally mounted on the vehicle chassis frame and a steering wheel for controlling the position of the wheels, the combination comprising:

a housing;

a worm shaft rotatably disposed in said housing;

means for operatively connecting said worm shaft to the steering wheel including rotatable gear means;

linearly movable means disposed in said housing;

follower means connecting said worm shaft to said linearly movable means, said linearly movable means being movable in response to rotation of said worm shaft;

motion transmitting means extending between said wheels and linearly movable means and operatively connected to said wheels; and means on each end of said linearly movable means for operatively connecting a respective end of said motion transmitting means thereto.

9. The combination of claim 8 wherein said motion transmitting means operatively connected to opposite ends of said linearly movable means is flexible.

10. The combination of claim 8 including a steering column shaft extension rotatably mounted in said housing, and said rotatable gear means includes a first gear fixed to said shaft extension.

11. The combination of claim 10 wherein said rotatable gear means further includes a second gear fixed to said worm shaft, said first and second gears being in meshing engagement with each other and having different pitch diameters.

References Cited

UNITED STATES PATENTS

| | | | |
|---|---|---|---|
| 655,702 | 8/1900 | Frankenberg | 280—93 |
| 669,557 | 12/1901 | Stevens | 280—93 |
| 1,582,378 | 4/1926 | Brueckmann | 74—501 |
| 1,723,789 | 8/1929 | Kirkbride | 280—87 X |
| 1,884,474 | 10/1932 | Wolforth. | |
| 2,869,377 | 1/1959 | Pieterse | 74—501 X |
| 2,893,016 | 7/1959 | Zion. | |
| 2,894,525 | 7/1959 | Erickson | 180—79.2 X |
| 3,208,300 | 9/1965 | Morse | 74—507 X |

KENNETH H. BETTS, *Primary Examiner.*

U.S. Cl. X.R.

74—501